United States Patent
Koseki et al.

(10) Patent No.: US 6,290,136 B1
(45) Date of Patent: Sep. 18, 2001

(54) CARD EJECTION MECHANISM FOR PCMCIA CONNECTOR

(75) Inventors: Yoshitsugu Koseki, Nagano (JP); Hung-Chi Yu, Hsi-Chih; Ming-Chun Lai, Hsin-Chuan, both of (TW)

(73) Assignee: Foxconn International, Inc. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/408,817

(22) Filed: Sep. 29, 1999

(30) Foreign Application Priority Data

Dec. 31, 1998 (TW) ............................... 87222063 U

(51) Int. Cl.$^7$ ................................................. G06K 13/00
(52) U.S. Cl. .................... 235/475; 235/479; 439/159; 439/630
(58) Field of Search ................. 439/159, 540.1, 439/160, 153, 157, 607, 630; 235/475, 486, 479

(56) References Cited

U.S. PATENT DOCUMENTS

| | | | |
|---|---|---|---|
| 5,275,573 | * | 1/1994 | McCleerey ........................ 439/159 |
| 5,290,174 | * | 3/1994 | Woratyla et al. .................... 439/59 |
| 5,401,176 | * | 3/1995 | Lwee ................................. 439/64 |
| 5,421,737 | * | 6/1995 | Chen et al. ....................... 439/157 |
| 5,519,577 | * | 5/1996 | Dudas et al. ..................... 361/737 |
| 5,591,047 | * | 1/1997 | Yamada et al. .................. 439/541.5 |
| 5,634,805 | * | 6/1997 | Saito et al. ....................... 439/159 |
| 5,655,918 | * | 8/1997 | Soh ................................ 439/159 |
| 5,662,482 | * | 9/1997 | Shin ................................. 439/64 |
| 5,711,679 | * | 1/1998 | Spickler et al. .................... 439/79 |
| 5,730,610 | * | 3/1998 | Hsia et al. ....................... 439/160 |
| 5,795,190 | * | 8/1998 | Ono ................................. 439/607 |
| 5,967,803 | * | 10/1999 | Ho .................................. 439/79 |
| 5,993,227 | * | 11/1999 | Hsia et al. ....................... 439/159 |
| 6,059,586 | * | 5/2000 | Watanabe et al. ................ 439/159 |
| 6,071,149 | * | 6/2000 | Hara ............................... 439/607 |
| 6,104,620 | * | 8/2000 | Dudas et al. ..................... 361/800 |
| 6,109,941 | * | 8/2000 | Koseki et al. ..................... 439/159 |

FOREIGN PATENT DOCUMENTS 08-234867 A * 9/1996 (JP) .
2000-311745 * 11/2000 (JP) .

* cited by examiner

Primary Examiner—Michael G. Lee
Assistant Examiner—Diane I. Lee
(74) Attorney, Agent, or Firm—Wei Te Chung

(57) ABSTRACT

A PCMCIA connector having a header retaining a number of terminals therein, a shield having a pair of downwardly and inwardly bent extensions to define a receiving slot for receiving a PCMCIA card, and a card ejection mechanism for releasing the inserted card. An engaging device is formed on one of the extensions of the shield and a guide of the ejection mechanism for retentively mounting the guide to the shield. By such a design, occupied space on a printed circuit board on which the connector is mounted is reduced, and assembly of the card ejection mechanism is facilitated.

15 Claims, 7 Drawing Sheets

CARD EJECTION MECHANISM FOR PCMCIA CONNECTOR

BACKGROUND OF THE INVENTION

The present invention relates to a card connector, and particularly to a card ejection mechanism latchably mounted to a PCMCIA connector and occupying a limited space on a printed circuit board.

DESCRIPTION OF PRIOR ART

IC (integrated circuit) cards are popularly used to meet requirements of personal computers, especially notebook computers, for expanding memory thereof. One commonly used IC card is a PCMCIA card which conforms to the standards of the Personal Computer Memory Card International Association. A PCMCIA connector is thereby employed to accommodate a PCMCIA card. A card ejection mechanism is mounted to a side arm of the connector for ejecting the card from a card-receiving slot thereof. The card ejection mechanism commonly comprises a movable plate for removing an inserted card from the connector, a push rod disposed in a guide, and a pivotable ejector arm coupling the movable plate and the push rod together. Since the guide is typically integrally formed with the side arm of the connector which is made from plastic, a significant amount of space is occupied by the guide, which is out of line with current miniaturization trends. Pertinent conventional card connectors are disclosed in Taiwan Patent Application Nos. 84210015; 86213336; 86204066 and U.S. Pat. No. 5,655,918.

As shown in FIG. 1, a conventional PCMCIA connector for interconnecting a PCMCIA card to a printed circuit board comprises a retention plate 1 attached to opposing side arms 2 via a pair of supports 11 extending therefrom. The side arms 2 made from plastic are adapted to guide and retain an inserted card (not shown) in a receiving slot (not labeled) defined therein. A guide 21 for retaining a push rod 31 integrally extends from one of the side arms 2. One end of the push rod 31 extends through the guide 21 for coupling with one end of an ejector arm 32 pivotably attached to a movable plate 33. When the push rod 31 is manually actuated, the movable plate 33 is pushed by the ejector arm 32, thus removing the inserted card from the connector along the receiving slot of the side arms 2. However, since the guide 21 of the card ejection mechanism is integrally formed with the plastic side arm 2 of the connector, a significant amount of space is occupied on the circuit board on which the connector is mounted. Furthermore, since no shield is provided to shield the connector from EMI/RFI (Electromagnetic Interference/Radio Frequency Interference), signal transmission between the card and the circuit board may be adversely affected.

To solve such problems, a well-shielded PCMCIA connector having an improved card ejection mechanism occupying a limited space on a circuit board is requisite.

SUMMARY OF THE INVENTION

Accordingly, one object of the present invention is to provide a PCMCIA connector having a shield for shielding the connector from EMI/RFI thereby ensuring reliable signal transmission between an inserted PCMCIA card and a printed circuit board to which the connector is mounted.

Another object of the present invention is to provide a PCMCIA connector having an improved card ejection mechanism which occupies less space on a circuit board.

A further object of the present invention is to provide an improved card ejection mechanism latchably mounted to a PCMCIA connector thereby facilitating assembly.

In order to achieve the objects set forth, a PCMCIA connector in accordance with the present invention comprises a header retaining a plurality of terminals therein, a metal shield attached to the header having a pair of downwardly and inwardly bent extensions to define a receiving slot for receiving a PCMCIA card, and a card ejection mechanism for ejecting the inserted card from the receiving slot. The card ejection mechanism includes a guide latchably mounted to one side of the shield, a push rod with one end disposed in the guide, a swing arm pivotably attached to the shield, and a slide plate coupled with the swing arm for releasing the card. A plurality of mounting openings is formed in one of the extensions of the shield with a plurality of stop members extending thereinto. The guide comprises a plurality of latches for insertion into the corresponding mounting openings of the shield, and a plurality of abutments for abutting against an outer surface of the extension. A plurality of latching holes is defined between a portion of the latches and the corresponding adjacent abutments for engaging with the extension. Ends of a portion of the latches comprise stop pads bent at an angle for abutting against the corresponding stop members of the shield to prevent the guide from moving backwards. By such a design, the space occupied by the guide is decreased and assembly is facilitated.

Other objects, advantages and novel features of the invention will become more apparent from the following detailed description when taken in conjunction with the accompanying drawings.

DETAILED DESCRIPTION OF PREFERRED EMBODIMENTS

Figure 1:
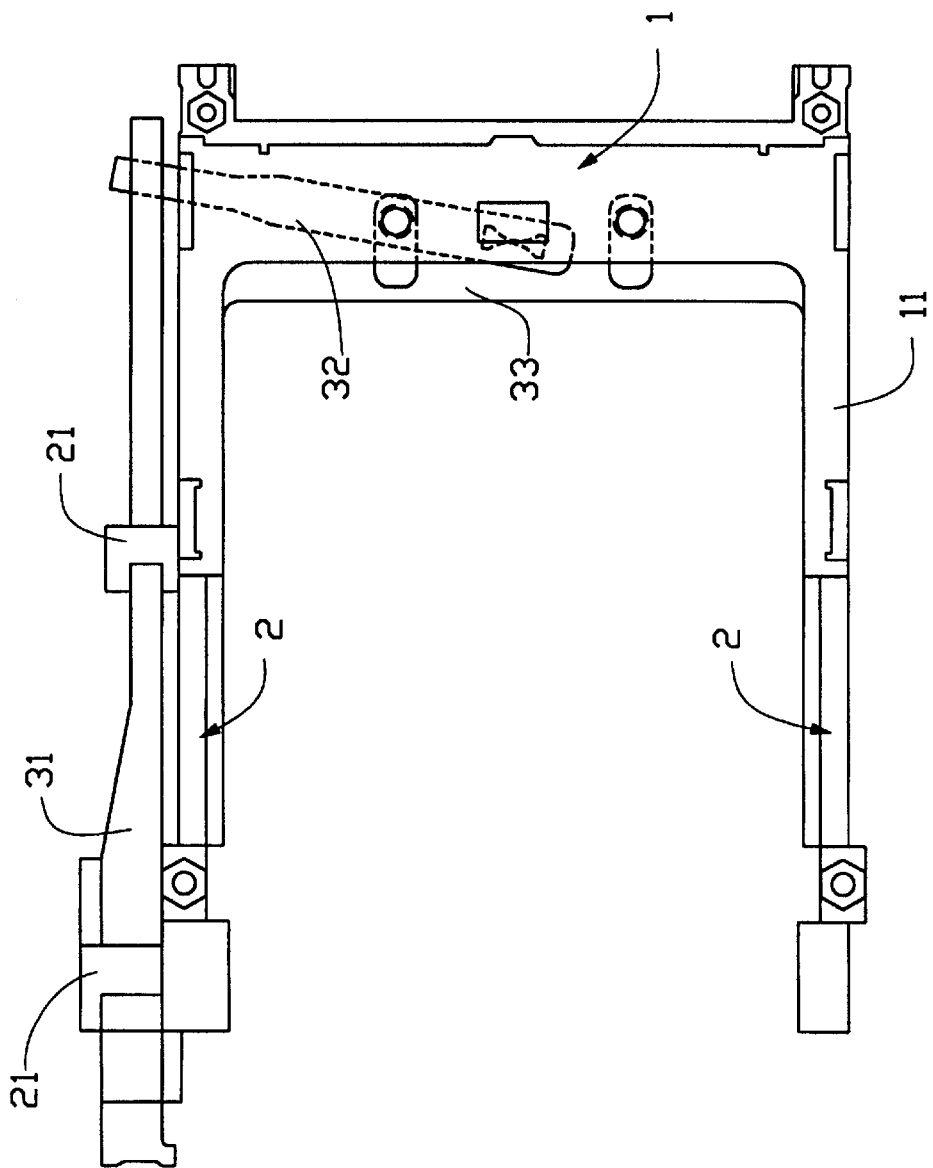
FIG. 1 is a top plan view of a conventional PCMCIA connector incorporating a card ejection mechanism.

For facilitating understanding, like components are designated by like reference numerals throughout the various embodiments of the invention as shown in the various drawing figures.

Figure 2:
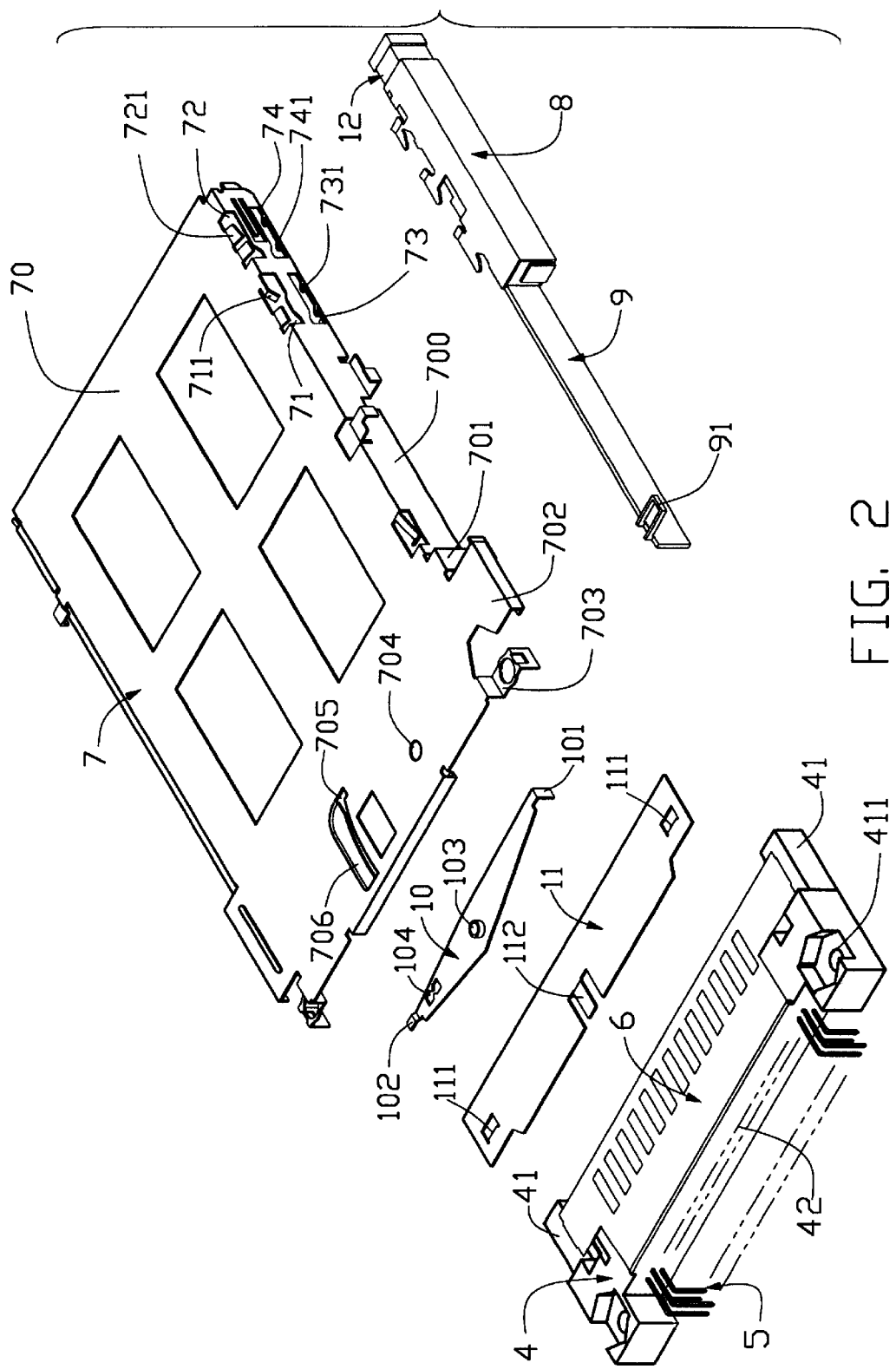
FIG. 2 is an exploded view of a PCMCIA connector in accordance with a first embodiment of the present invention.

Referring to FIG. 2, a PCMCIA connector in accordance with a first embodiment of the present invention comprises an insulative header 4, a plurality of terminals 5 retained in the header 4, a shielding plate 6 covering the header 4, a metal shield 7 attached to the header 4, and a card ejection mechanism (not labeled) mounted to the shield 7. The header 4 comprises a pair of opposite arms 41 each forming a bore 411 therein for extension of a bolt (not shown)

therethrough. A plurality of terminal-receiving passageways 42 is defined through the header 4 for receiving the terminals 5. One perpendicularly bent end of each terminal 5 emerges from the header 4 for connecting to a printed circuit board (not shown). The other end of each terminal 5 rearwardly extends from the corresponding passageway 42 for contacting mating contacts on an inserted PCMCIA card (not shown). The shielding plate 6 covering the header 4 is adapted for shielding the terminals 5 from EMI/RFI.

The card ejection mechanism comprises a metal guide 8, a metal push rod 9 disposed in the guide 8, a swing arm 10 pivotably attached to an inner surface of the shield 7, and a slide plate 11 coupled with the swing arm 10. The push rod 9 has a restriction tab 91 perpendicularly extending from an upper edge proximate a free end thereof with a hole (not labeled) formed therein. The swing arm 10 comprises a perpendicularly bent claw 101 extending from one end thereof for insertion into the hole of the restriction tab 91 thereby coupling the swing arm 10 with the push rod 9, and an opposite slide tab 102 bent in an opposite direction relative to the claw 101. A trunnion 103 which the swing arm 10 pivots about extends from a middle portion of the swing arm 10 in an opposite direction relative to the claw 101. An hourglass-shaped retention hole 104 is formed in the swing arm 10 proximate the slide tab 102. The slide plate 11 having an elongate shape comprises a pair of ejector tabs 111 vertically extending therefrom proximate opposite ends thereof in the same direction as the claw 101 of the swing arm 10 for removing the inserted card from the connector. An insertion projection 112 is bent in an opposite direction relative to the ejector tab 111 for insertion into the retention hole 104 of the swing arm 10 thereby attaching the slide plate 11 thereto.

The shield 7 for shielding the terminals 5 and the inserted card comprises a body 70 having a shape generally corresponding to the inserted card with a pair of extensions 700 downwardly extending from opposite edges thereof. The extensions 700 are inwardly bent to define a receiving slot (not shown) for receiving the inserted card. An L-shaped retention hook 701 downwardly extends from one edge of the body 70 for retaining the push rod 9. A retention member 702 extends from the body 70 proximate the retention hook 701 and perpendicular to the extension 700 for retaining the restriction tab 91 of the push rod 9. A pair of engaging tabs 703 extends from opposite edges of the body 70, each forming an aperture (not labeled) therein corresponding to the bore 411 of the header 4 for extension of the bolt therethrough thereby attaching the shield 7 to the header 4. A pivot hole 704 is formed in the body 70 for receiving the trunnion 103 of the swing arm 10. An arcuate slot 705 is disposed in the shield 7 proximate a middle portion thereof. A concave plane 706 is formed adjacent to an edge of the arcuate slot 705 for limiting movement of the slide tab 102 of the swing arm 10.

Mounting openings 71, 72 having different shapes are formed in a boundary between the body 70 and the extension 700. A stop arm 711 integrally extends forward from the body 70 in a longitudinal direction into the opening 71. A stop tab 721 transversely extends from the body 70 into the opening 72. Mounting openings 73, 74 having similar shapes are formed directly beneath the mounting openings 71, 72, respectively. A pair of stop fingers 731, 741 extends from a bottom edge of the extension 700 in the same direction as the stop arm 711 into the respective openings 73, 74. The stop arm 711, the stop tab 721 and the stop fingers 731, 741 are referred to as stop members for facilitating description and understanding.

Figure 4:
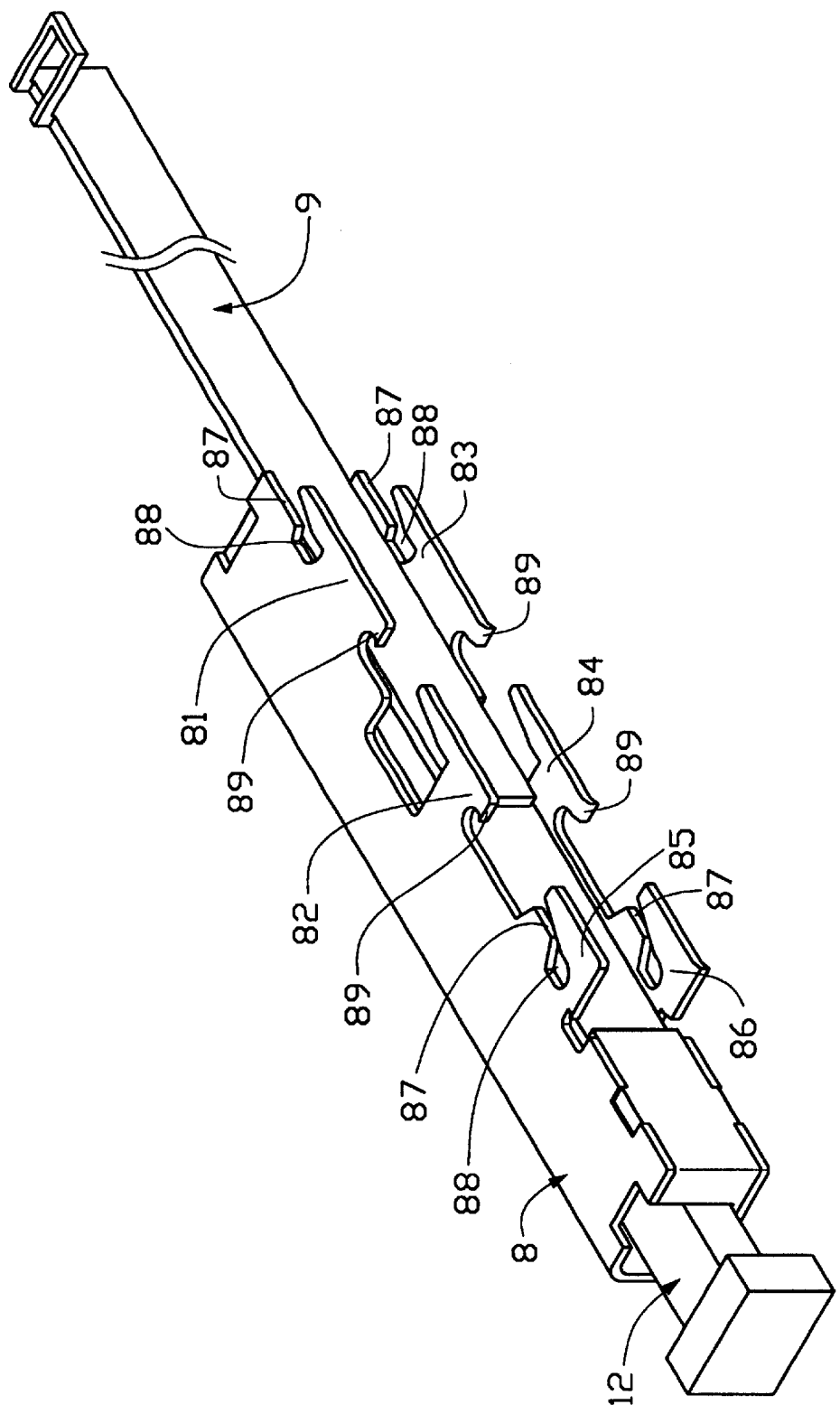
FIG. 4 is a perspective view of the guide and a push rod disposed in the guide.

Referring to FIG. 4, the guide 8 is elongate and has a U-shaped cross-section. Six latches 81, 82, 83, 84, 85, 86 integrally extend from upper and lower surfaces (not labeled) of the guide 8, wherein three of the latches 81, 82, 85 extend from the upper surface and the remaining latches 83, 84, 86 extend from the lower surface. Four abutments 87 respectively extend from the upper and lower surfaces of the guide 8 proximate extending ends (not labeled) of the latches 81, 83, 85, 86 thereby defining latching holes 88 therebetween. The vertical distance between each abutment 87 and the corresponding adjacent latch 81, 83, 85, 86 is slightly smaller than the thickness of the shield 7 to implement an interferential engagement between the guide 8 and the shield 7. A stop pad 89 extends from four of the latches 81, 82, 83, 84 opposite the extending end thereof. The stop pads 89 of the latches 81, 82 are upwardly bent, and the stop pads 89 of the latches 83, 84 are downwardly bent for abutting against the corresponding stop members of the shield 7.

Figure 3:
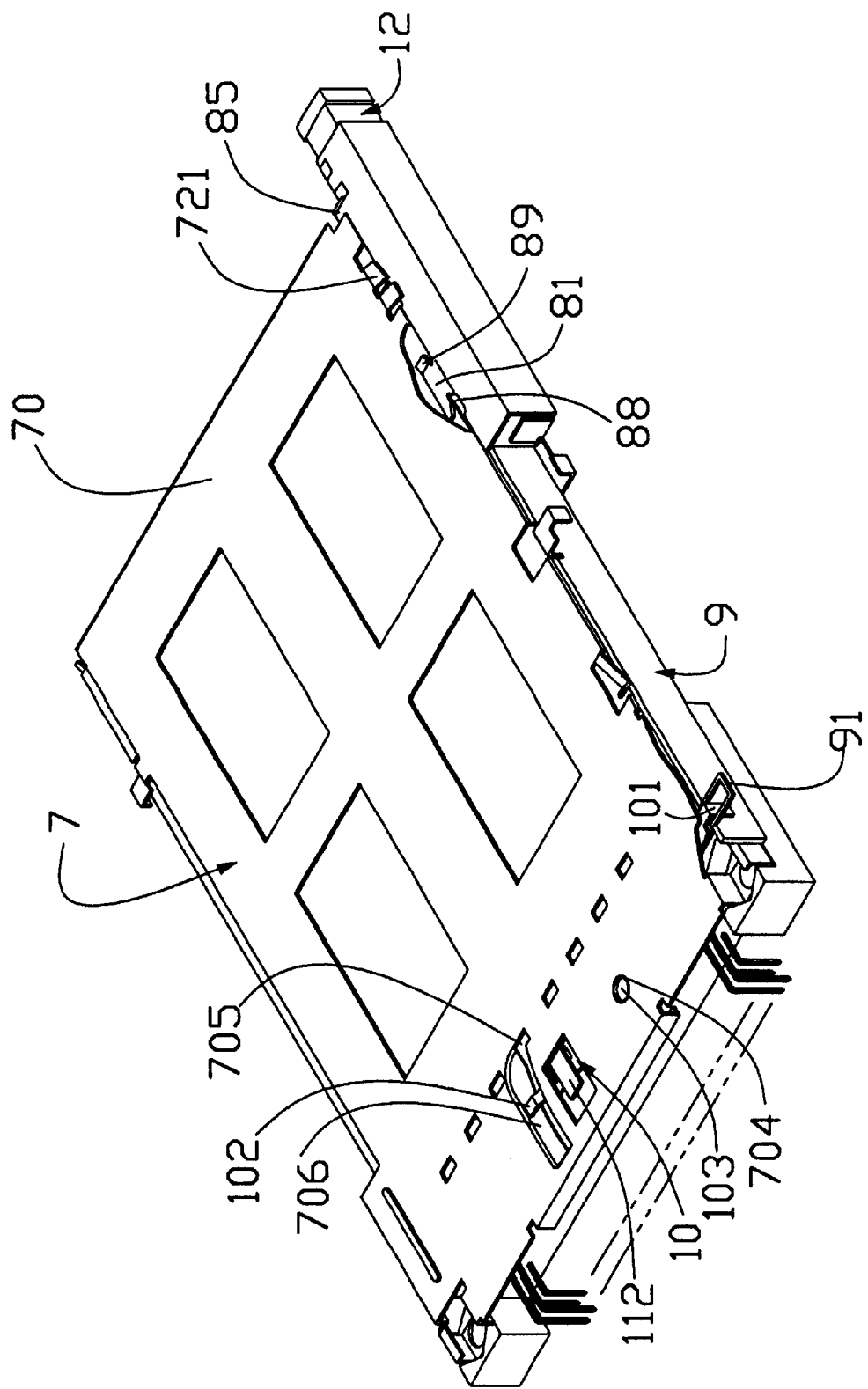
FIG. 3 is an assembled view of FIG. 2 partially cutaway to show a latch formed on a guide of a card ejection mechanism.
Figure 5:
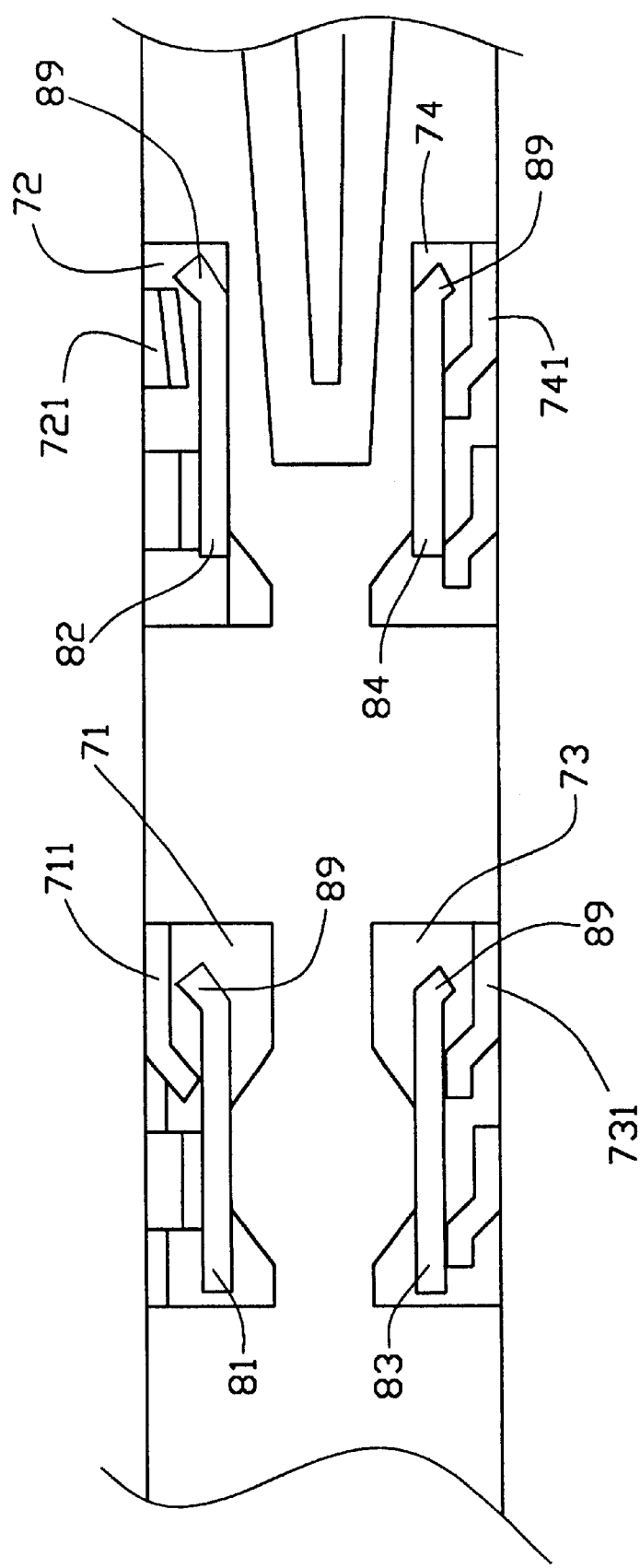
FIG. 5 is a plan view illustrating insertion of latches of the guide into corresponding mounting openings of a shield.
Figure 6:
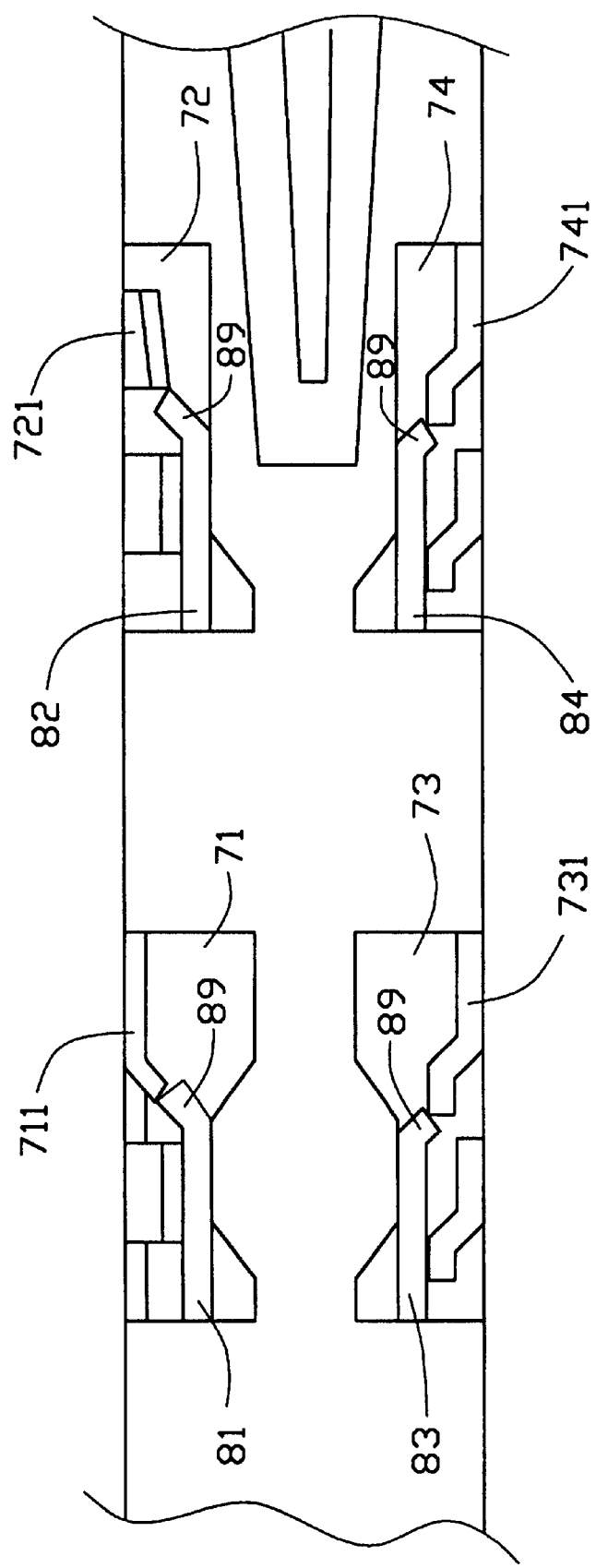
FIG. 6 is a plan view illustrating engagement of the latches of the guide with stop members of the shield.

Reference is now directed to FIGS. 3, 5 and 6. When mounting the guide 8 to the shield 7, the latches 81, 82, 83, 84 of the guide 8 are inserted into the corresponding mounting openings 71, 72, 73, 74 of the shield 7, and the latches 85, 86 abut against an inner surface of the extension 700. The guide 8 is pushed forward to move the foremost latching holes 88 defined by the latches 81, 83 and the abutments 87 into engagement with the extension 700 at a final position. At this position, the abutments 87 abut against an outer surface of the extension 700, and the stop pads 89 of the latches 81, 82, 83, 84 abut against the corresponding stop members 711, 721, 731, 741 for preventing adverse movement thereof. Since the vertical distance between each latch 81, 83, 85, 86 and the corresponding abutment 87 is slightly smaller than the thickness of the shield 7, the guide 8 is retentively attached to the shield 8 by a press fit between the latches 81, 83, 85, 86 and the shield 8.

Referring to FIGS. 2 and 3, one end of the push rod 9 is inserted into the guide 8 to engage with an ejector 12, and the other end extends through the retention hook 701 and the retention member 702 of the shield 7 with the restriction tab 91 retained in the retention member 702. The insertion projection 112 of the slide plate 11 is inserted into the retention hole 104 of the swing arm 10 and abuts against a surface thereof. The swing arm 10 together with the slide plate 11 is then attached to the shield 7 and abuts against an inner surface thereof by inserting the trunnion 103 into the pivot hole 704 and retaining the slide tab 102 in the arcuate slot 705 of the shield 7. The slide tab 102 abuts against the concave plane 706 of the arcuate slot 705 to facilitate pivotal movement thereof. The claw 101 of the swing arm 10 is retained in the hole of the restriction tab 91 of the push rod 9 to restrict movement thereof. Thus, the push rod 9, the swing arm 10 and the slide plate 11 are pivotably attached together. When a push button (not labeled) of the ejector 12 is manually depressed, the push rod 9 is actuated to move forward within a space defined by the retention hook 701 and the retention member 702 whereby the swing arm 10 is actuated by the claw 101 to pivot about the trunnion 103. The pivotal movement of the swing arm 10 is then translated into linear movement of the slide plate 11 through the insertion projection 112 in an opposite direction with respect to the push rod 9 thereby removing the card from the connector. The shield 7 together with the card ejection mechanism is finally attached to the header 4 by the bolts extending through the engaging tabs 703 thereof and the bores 411 of the header 4.

Figure 7:
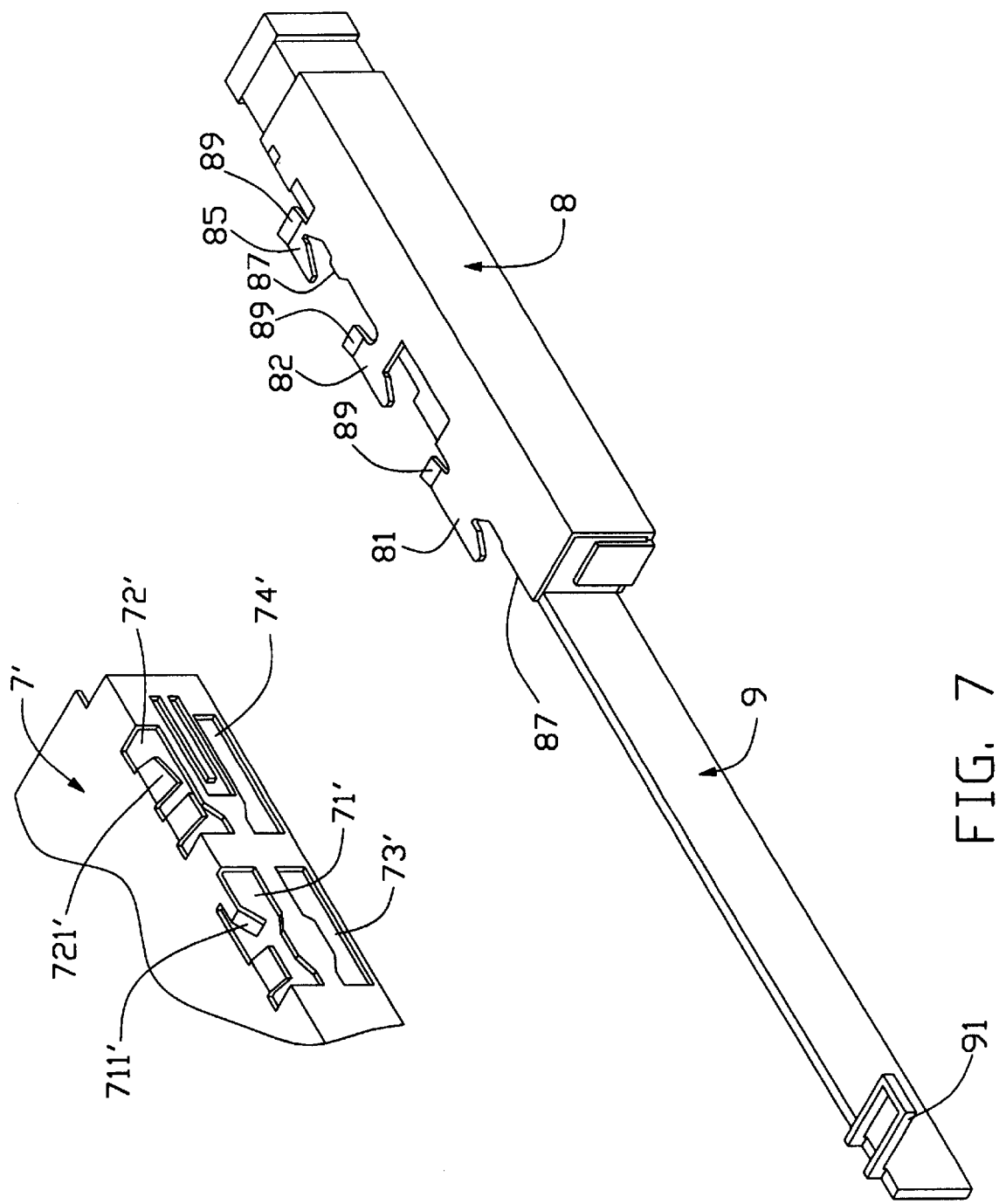
FIG. 7 is an exploded view of a guide and a fragment of a shield before engagement in accordance with a second embodiment of the present invention.

FIG. 7 shows a fragment of a shield 7' in accordance with a second embodiment of the present invention. Four mounting openings 71', 72', 73', 74' are formed in the shield 7'similar to those of the first embodiment. A stop arm 711' and a stop tab 721' respectively extend into the openings 71', 72' in the same manner as those of the first embodiment. The difference is that the openings 73', 74' do not have spring fingers extending thereinto. The guide 8 is mounted to the shield 7' by engaging the latches 81, 82 thereof with the mounting openings 71', 72'. Since other components of the second embodiment are identical to those of the first embodiment, a detailed description thereof is omitted herein.

The design of this card ejection mechanism of the present invention occupies less space on the circuit board. Since the guide 8 together with the push rod 9 is latchably mounted to the shield 7, assembly is thereby facilitated. Furthermore, due to the shield 7, the connector and the inserted card are well shielded from EMI/RFI.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A card connector for interconnecting an inserted card with a printed circuit board on which the connector is mounted, the card connector comprising:
   a header defining a plurality of terminal-receiving passageways therein;
   a plurality of terminals received in corresponding passageways of the header for connecting with a mating contact array of the card;
   a metal shield attached to the header and comprising a body and a pair of opposite extensions extending from the body, the extensions being spaced a distance substantially equal to the width of the card, the body and the extensions defining a receiving slot for receiving the card;
   a card ejection mechanism adapted to lease the card comprising an ejector, a guide, a push rod disposed in the guide, and swing arm attached to the shield and coupled at one end with the push rod, the swing arm attached to the shield and coupled at one end with the push rod, the swing arm being pivotally coupled with a slide plate, the push rod being actuatable to cause the slide plate to eject the card from the receiving slot; and
   engaging means formed on the shield and the guide of the card ejection mechanism for mounting the guide to the shield, the engaging means of the shield comprising a plurality of mounting openings formed in one of the extensions thereof, and bent stop members extending from the shield into some of the mounting openings in order to mount said ejection assembly onto said metal shield.

2. The card connector as described in claim 1, wherein the engaging means of the guide comprises a plurality of latches for engaging with the corresponding openings of the shield, a plurality of abutments proximate a portion of the latches for abutting against the extension of the shield, and a latching hole defined between the latch and the corresponding proximate abutment, the vertical distance between the latch and the abutment being slightly smaller than the thickness of the shield.

3. The card connector as described in claim 2, wherein the latches and abutments integrally extend from upper and lower surfaces of the guide.

4. The card connector as described in claim 2, wherein a portion of the latches comprise stop pads formed on ends thereof and slightly bent for abutting against corresponding stop members bent in an opposite direction to prevent the guide from disengaging from the shield extension.

5. The card connector as described in claim 1, wherein the push rod comprises a restriction tab perpendicularly extending from an upper edge of a free end thereof, a hole being formed in the restriction tab.

6. The card connector as described in claim 5, wherein the swing arm comprises a perpendicularly bent claw at one end thereof for being retained in the hole of the restriction tab of the push rod thereby restricting a movement thereof.

7. The card connector as described in claim 6, wherein the swing arm comprises a slide tab at the other end thereof bent in an opposite direction relative to the claw.

8. The card connector as described in claim 7, wherein the shield comprises an arcuate slot formed in a front portion thereof for retaining the slide tab of the swing arm, a concave plane being formed adjacent to an edge of the arcuate slot for allowing a movement of the slide tab.

9. The card connector as described in claim 1, wherein the swing arm comprises a trunnion for being pivotably received in a pivot hole formed in the shield.

10. The card connector as described in claim 1, wherein the slide plate comprises an insertion projection for insertion into a retention hole of the swing arm, thereby coupling the slide plate with the swing arm.

11. The card connector as described in claim 1, wherein the slide plate comprises a pair of downwardly bent ejector tabs integrally formed proximate opposite ends thereof for ejecting the card from the receiving slot of the shield.

12. The card connector as described in claim 1, wherein the extensions of the shield are inwardly bent to cooperate with the body to define the receiving slot.

13. The card connector as described in claim 1, wherein the shield comprises an L-shaped retention hook downwardly extending from a longitudinal edge thereof for retaining the push rod.

14. A card connector for used with a card, comprising:
   a header and a plurality of terminals received therein;
   a metal shield attached to the header and comprising a body and a pair of opposite extensions extending from the body, the extensions being spaced a distance substantially equal to the width of the card, the body and the extensions defining a receiving slot for receiving the card;
   a card ejection mechanism adapted to release the card and comprising a guide enclosing a push rod being actuatable to eject the card from the receiving slot; and
   openings formed in one of the shield and the guide, and latches formed on the other of said shield and said guide for mounting the guide to the shield where said guide is attached to the shield in a lateral direction of the shield to the latches inserted into the corresponding openings, respectively, and then said guide is moved along the longitudinal direction of the shield to have the latches latchably engaged with portions of the shield around said corresponding openings, respectively, in order to mount said ejection assembly onto said metal shield.

15. The card connector as described in claim 14, wherein a stop device is formed around at least one opening to prevent backward movement of the guide with regard to the shield along said longitudinal direction.

* * * * *